(12) United States Patent
Templeton

(10) Patent No.: US 8,143,874 B2
(45) Date of Patent: Mar. 27, 2012

(54) SWITCH-MODE POWER SUPPLY (SMPS) CONTROLLER INTEGRATED CIRCUIT DETERMINING OPERATING CHARACTERISTICS FROM FILTER COMPONENT INFORMATION

(75) Inventor: James W. Templeton, Austin, TX (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 454 days.

(21) Appl. No.: 12/408,455

(22) Filed: Mar. 20, 2009

(65) Prior Publication Data
US 2010/0237838 A1 Sep. 23, 2010

(51) Int. Cl.
*G05F 1/40* (2006.01)
(52) U.S. Cl. .......................... 323/283; 323/286
(58) Field of Classification Search .................. 323/222, 323/225, 268, 271, 282, 283, 285, 286
See application file for complete search history.

(56) References Cited

U.S. PATENT DOCUMENTS

| | | | |
|---|---|---|---|
| 5,475,296 A | 12/1995 | Vinsant et al. | |
| 5,675,485 A | 10/1997 | Seong | |
| 6,005,377 A | 12/1999 | Chen et al. | |
| 6,979,987 B2 | 12/2005 | Kernahan et al. | |
| 7,292,019 B1 | 11/2007 | Fernald | |
| 7,467,309 B2 | 12/2008 | Templeton | |
| 7,629,782 B2 * | 12/2009 | Naka | 323/271 |
| 7,646,185 B2 * | 1/2010 | Kim | 323/283 |
| 7,795,854 B2 * | 9/2010 | Xia et al. | 323/283 |
| 2008/0150500 A1 * | 6/2008 | Gurcan | 323/271 |

OTHER PUBLICATIONS

Bianco, et al., "Digital Control Loop Brings Self-Configured Controllers for High Performance and High-Efficiency DC-DC Conversion", Darnell Digital Power Forum, Sep. 2008, San Francisco, CA.
Maxim MAX1846 Datasheet, Maxim Integrated Products, Inc., 2005, Sunnyvale, CA.

* cited by examiner

*Primary Examiner* — Matthew Nguyen
(74) *Attorney, Agent, or Firm* — Mitch Harris, Atty at Law, LLC

(57) ABSTRACT

A switch-mode power supply (SMPS) controller integrated circuit (IC) provides ease of integration and SMPS designs. Value and/or types of components external to the controller IC that affect the SMPS control loop response are provided to the IC and an internal conversion block determines coefficients for a digital compensator in conformity with the provided value/type information. The conversion block may be a look-up table, processor or dedicated logic, and the component value/type information may be provided via terminals of the controller IC via logic state, attached resistance/capacitance or from external storage. Alternatively, the component values may be programmed into non-volatile storage within the controller IC.

26 Claims, 6 Drawing Sheets

SWITCH-MODE POWER SUPPLY (SMPS) CONTROLLER INTEGRATED CIRCUIT DETERMINING OPERATING CHARACTERISTICS FROM FILTER COMPONENT INFORMATION

BACKGROUND OF THE INVENTION

1. Field of the Invention

The present invention relates generally to techniques for setting operating characteristics of switch-mode power supplies (SMPSs), and more specifically, to an SMPS controller integrated circuit that internally adjusts operating characteristics parameters from specified filter component information.

2. Background of the Invention

Switching power converters, referred to as switch-mode power supplies (SMPSs) are currently in widespread use for applications such as systems power supplies, AC power inverters, as well as localized power supplies, also known as point-of-load (PoL) supplies, such as voltage regulator modules (VRMs) for microprocessors. In an SMPS, one or more magnetic storage elements such as inductors or transformers are energized and interrupted by a switching circuit and the stored energy is typically periodically transferred to one or more capacitive storage elements. The output voltage or output current (or an analog of the output voltage/current) of the SMPS is sensed by a sensing circuit and used to control the switching circuit so that voltage or current regulation is provided over a variety of input voltage, output load and temperature variation ranges.

A compensation circuit or "compensator" is provided in the feedback and/or feed-forward paths of the converter between the sensing circuit and the switching circuit and sets the control response of SMPS to the sensed output voltage and/or current. The compensator modifies the closed-loop response of the converter to ensure that the converter is stable, i.e., the output is well-behaved, and to ensure desired operating conditions. The compensator is typically provided by a controller integrated circuit (IC) that typically receives output current and/or voltage information as well as input voltage information, and generates one or more output control signals to control the SMPS switching circuits. In analog compensation schemes, external components are used in conjunction with internal amplifiers of the controller IC to provide the compensator filter.

An integrated circuit controller designed for general purpose use in a variety of applications generally includes a compensator that can be adjusted over a wide range of frequency and phase response characteristics. In traditional analog compensator implementations, external terminals of the controller IC expose circuit nodes of a feedback signal chain that implements the compensator. Passive components, typically resistors and capacitors connected to one or more terminals of the integrated circuit provide a network that directly determines the compensator frequency response according to the interaction of the components in the network with the internal elements of the compensator. For example, poles and zeros of an amplifier stage internal to the IC can be set by RC feedback and input networks connected to an output and input of the amplifier that are connected to terminals of the IC. The values of the resistors and capacitors are determined from the desired locations of the poles and zeros of the compensator response, which are first determined from the external components and line/load conditions of the actual SMPS implementation.

In digital power control applications, the compensator is generally a digital compensator provided by a digital signal processing block or dedicated filter logic units. Coefficients, which are floating-point or fixed-point numbers that dictate the discrete-time computations needed to provide the response, are provided to the controller IC by techniques such as auto-compensation start-up calibration, by programming non-volatile (NV) storage within the controller IC with the coefficients, which are read at start-up, or by reading the coefficients from an external storage device. The coefficient values are typically determined by a computer program that is used by a power supply designer to specify the component values of the SMPS external to the controller, such as the inductances, capacitances and resistances of the filter components external to the controller IC, which are then used by the program to compute the coefficients required to obtain a particular response selected by the designer.

In practice, it is desirable to be able to integrate and initially test an SMPS design without having to use a design program to determine the initial compensation values and program those values into a prototype unit. In many instances, an SMPS controller IC is being evaluated in a particular application without the luxury of extended engineering design time or without the availability of all of the requisite tools. However, due to the wide ranges of external component values for a typical controller IC, stable operation, and thus useful evaluation cannot be guaranteed without some compensation based upon the actual external component values selected for an SMPS design. Further, every time a component value, type or operating parameter (e.g., input voltage) is changed in an SMPS design, the computer program and any necessary NV storage programming tools must then be used to update the compensation coefficients.

Finally, other operating parameters of the SMPS are dependent on the filter component values, such as output ripple, transient response, etc., and therefore operational characteristics other than compensation of the SMPS are affected when filter component values change.

Therefore, it would be desirable to provide a digitally-compensated SMPS controller IC that can be compensated without resort to design programs that determine the compensator coefficients. It would further be desirable to provide such an SMPS controller IC that does not require a NV storage programmer or external storage device for initialization. It would further be desirable to provide an SMPS controller IC in which other operating characteristics dependent on filter component values or types can be controlled to provide and maintain desired operation of an SMPS.

SUMMARY OF THE INVENTION

The above stated objectives, as well as others, are achieved in an integrated circuit (IC) controller for a switch-mode power supply (SMPS) and its method of operation. The SMPS controller IC includes a conversion block, which may be a processor, one or more look-up tables, or dedicated logic that computes one or more operating characteristic(s) of the SMPS from information provided to the controller IC indicating values and/or types of components in the output filter of the SMPS.

The operating characteristic(s) may be the frequency/phase response of a digital compensator within the controller IC that controls the frequency and phase response of the SMPS control loop, or may be another circuit that controls an operating characteristic of the SMPS that is affected by a type or value of the filter component(s).

The filter component value and/or type information may be provided at terminals of the integrated circuit, either by logical values provided at the terminals, resistors or capacitors connected to the terminals such that the values of the resistors or capacitors indicate the values of the external SMPS components, or from external digital storage containing the external component values. The resistors or capacitors used to specify the value or type information for the filter components are not the filter components themselves and do not directly form a part of the compensator circuit. Alternatively, the filter component values may be programmed into non-volatile (NV) storage within the controller IC.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present invention encompasses switch-mode power supply (SMPS) controller integrated circuits (ICs) and their methods of operation. SMPS techniques and ICs in accordance with the present invention convert information specifying values or types of the output filter components of the SMPS, generally the external inductor(s) and capacitor(s) that are connected to the SMPS output terminal. The IC of the present invention includes a "conversion" block that calculates or looks up values for control variables of the SMPS, such as coefficients that determine the response of a digital compensator within the IC. By supplying the filter component values and/or type information directly in raw form, rather than supplying control variables such as compensation coefficients or profiles, a designer or other end-user incorporating the IC in a particular design may easily integrate the IC and make changes to external SMPS filter component values, without requiring the designer to compute the actual compensator parameters (e.g., pole/zero locations, gain terms, coefficients) for a particular set of external SMPS filter components.

For example, an integrated circuit in accordance with an embodiment of the present invention may have a single control terminal, with the logic state of that control terminal indicating to the digital compensator whether the capacitor(s) in the SMPS LC filter are ceramic or aluminum electrolytic. The digital compensator within the IC is then adjusted in accordance with the indication provided at the control terminal, providing a simple mechanism for manufacturing to adapt an assembly to receive either electrolytic or ceramic capacitors by altering a circuit board or placing jumpers to change the state of the control terminal. Such a control terminal can also provide an easy mechanism for a designer to change the capacitor type during evaluation of a circuit. In general, SMPS controller ICs in accordance with embodiments of the present invention will receive parameter information such as output filter inductor inductance and series resistance, output filter capacitor capacitance and equivalent series resistance (esr). From the provided filter component values and other information such as input voltage and switching frequency, one or more control parameters such as the pole/zero locations and gain terms for the compensator can generally be determined, since the controller IC includes most of the portions of the SMPS (e.g., those portions of the SMPS other than the external filter components) that determine the overall dynamic behavior of the SMPS.

Figure 1:
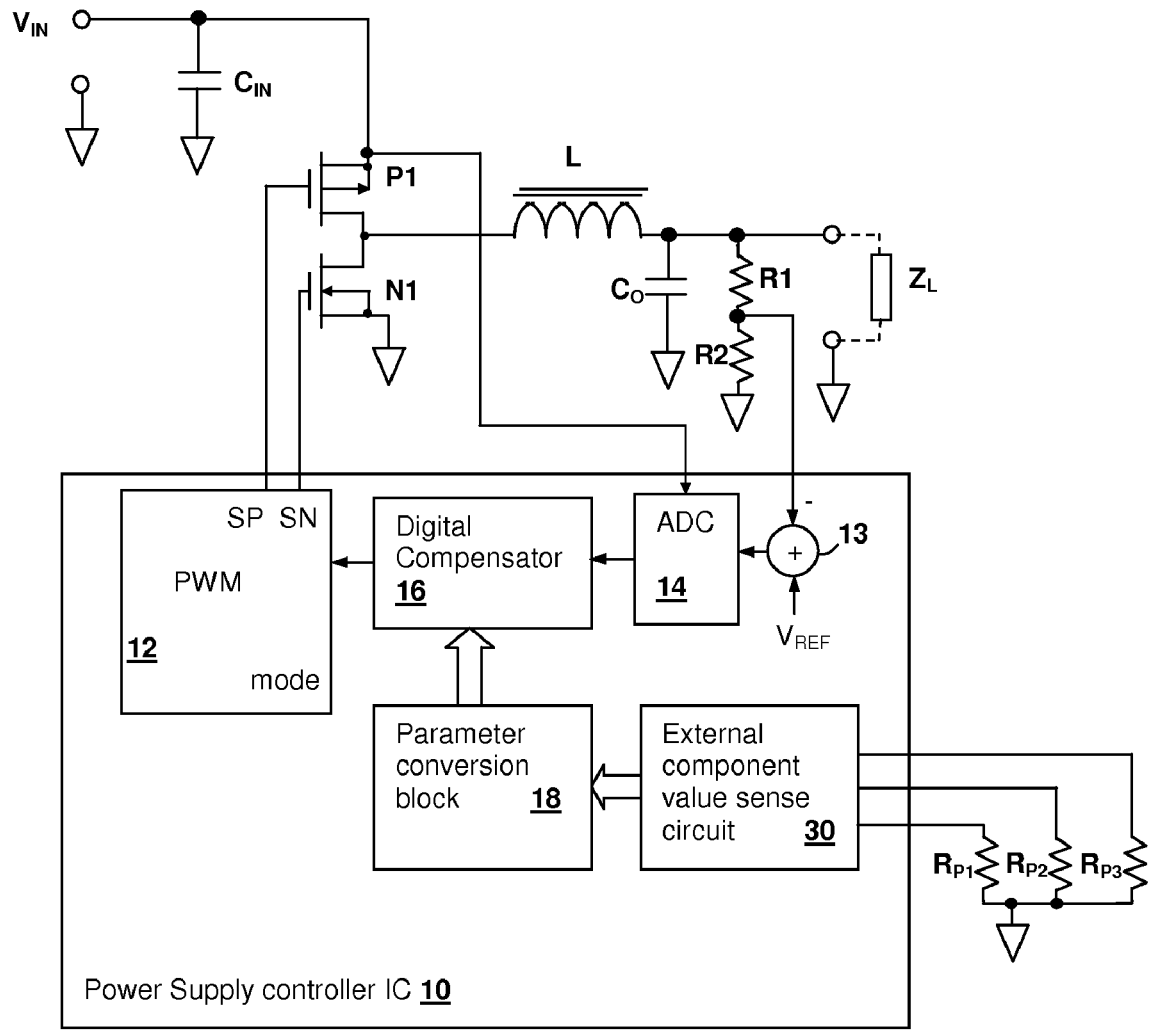
FIG. 1 is a schematic diagram depicting an SMPS in accordance with an embodiment of the invention.

Referring now to the Figures, and in particular with reference to FIG. 1, an SMPS in accordance with an embodiment of the present invention is shown. The depicted converter is a DC-to-DC buck converter, but it is understood that the techniques of the present invention apply to SMPSs of other topologies and input/output voltage types, as SMPSs in general have feedback or feed-forward compensators that remove the low frequency resonance due to the interaction of the inductive and capacitive energy storage elements and then attenuate the gain of the converter above a predetermined roll-off frequency to maintain stability for frequencies above the control bandwidth of the SMPS. Further, the techniques of the present invention apply to adjustments of operational control variables other than, or in addition to, compensator phase and frequency response. However, for the purpose of illustration, the filter component information provided in the present invention will be converted to compensator control for the purposes of exemplary illustration in the embodiments described below.

In particular, the inductance and capacitance of the LC filter components determine, at least in part, the SMPS control loop response provided by the digital compensator to set the desired dynamic behavior of the SMPA. The applied compensation may also effectively cancel or utilize the effects of "parasitic" poles or zeros, such as utilizing zeros caused by output capacitor esr in a voltage mode SMPS control loop. Since variation of the esr in such applications will cause variations in the loop response, the esr must be taken into account. For example, electrolytic capacitors typically provide an esr zero at a frequency sufficiently low that significant phase lead from the esr zero is introduced in the loop response at the crossover frequency, i.e., the frequency at which the SMPS loop gain reaches unity. In present-day SMPS converters, such a zero may be needed in the response of a digital compensator, depending on the esr of the output capacitor(s). If the esr is high (e.g., if the output capacitors are electrolytic types), the resultant zero introduced in the response by the interaction of the esr with the output capacitance is generally sufficient to avoid oscillation at high frequencies. However, if ceramic capacitors are used an additional zero may be needed in the SMPS control loop response, and therefore provided by the digital compensator. Additionally, if both ceramic and electrolytic types are present in parallel, an extra zero may be needed, but it may be needed at a different frequency. Merely knowing the type(s) of the output capacitor may provide enough information to determine whether it is necessary to compensate for an esr zero, or not. The buck converter of FIG. 1 includes a digital compensator 16 that is adjusted by providing information specifying the values and/or types of external components such as inductor L and capacitor $C_O$ via a set of external parameter-specifying components, which in the illustrated example are resistors $R_{P1}$, $R_{P2}$ and $R_{P3}$.

An input voltage $V_{IN}$ is provided on a pair of input terminals and across capacitor $C_{IN}$. A switching circuit including transistors P1 and N1 alternately switches a first terminal of an inductor L between the terminal connected to input voltage $V_{IN}$ and ground. The second terminal of inductor L is connected to an output capacitance $C_O$, which may be a single capacitor $C_O$ or a capacitor bank. Capacitor $C_O$ is coupled to terminals adapted for connection to a load, represented in the Figure by an impedance $Z_L$. Power supply controller integrated circuit (IC) 10 operates the switching circuit formed by transistors P1 and N1 in accordance with a control loop provided by analog-to-digital converter (ADC) 14 and digital compensator 16 that provides the control input value to a pulse-width modulator (PWM) 12. PWM 12 is exemplified by a digital pulse-width modulator (DPWM), but it is understood that other modulator types such as analog PWMs and digital pulse frequency modulators (DPFM) can be used in alternative embodiments of the present invention. Analog-to-digital converter 14 generally provides information to digital compensator 16 regarding output voltage, input voltage and output current, but in a particular embodiment, not all of the above-mentioned input variables may be present. At a minimum, for voltage-mode control, at least the output voltage is measured by ADC 14 and in current-mode control applications, the inductor or a switching transistor current will generally be measured as well, unless a technique to extrapolate the output current from output voltage variation is used. An error summing circuit 13, subtracts the output voltage across impedance $Z_L$ from a reference voltage $V_{REF}$, to provide an error voltage to ADC 14. Alternatively, the output voltage may be measured directly by ADC 14.

The response of digital compensator 16 is determined in part by coefficients provided from parameter conversion block 18. Parameter conversion block 18 receives information about one or more external component "parameters", e.g., the inductance of inductor L, the capacitance of output capacitor $C_O$ the type or actual esr value of output capacitor $C_O$, as well as other possible external component values or types, including "parasitic" values such as inductor/transformer winding resistance and capacitance, etc. Parameter conversion block 18 receives parameter information from an external component value sensing circuit 30, which in the illustrated example, determines the resistances of resistors $R_{P1}$, $R_{P2}$ and $R_{P3}$, or at least a number indicated by a range of values in which the actual resistance value of resistors $R_{P1}$, $R_{P2}$ and $R_{P3}$ fall. As will be illustrated below, capacitors may alternatively be used, or a combination of both components might be used with proper provision of an external component value sensing circuit 30 that can determine whether or not a resistor or capacitor is connected to one of the external terminals of controller IC 10. While the external resistors and/or capacitors described above are used to specify component parameters (e.g., output filter component values or types), the external resistors and/or capacitors described above do not directly determine the loop response, for example as in analog controllers in which external resistors and capacitors are used to implement a compensation filter. Nor are the external resistors and/or capacitors used to specify or select the compensation coefficients or frequency response directly. The component parameters are converted through a computational or look-up process that combines information such as input voltage, switching frequency, desired loop response and multiple external component values in order to obtain a response that will be implemented by digital compensator 16.

Parameter conversion block 18 uses the values/range information provided from external component value sensing circuit 30 for each of resistors $R_{P1}$, $R_{P2}$ and $R_{P3}$ and uses the value/range information to calculate or look-up compensation parameters which may include gain terms, z-transform coefficients, pole/zero locations and the like, for setting the frequency/phase response of digital compensator 16. For example, the following table might apply to values of resistors $R_{P1}$, $R_{P2}$ and $R_{P3}$:

TABLE I

| $R_{P1}$ | $R_{P2}$ | $R_{P3}$ | L | $C_0$ | esr $C_0$ |
|---|---|---|---|---|---|
| 100 Ω | 100 Ω | 100 Ω | 1 µH | 0.1 µF | 0.1 Ω |
| 1000 Ω | 100 Ω | 100 Ω | 10 µH | 0.1 µF | 0.1 Ω |
| 100 Ω | 1000 Ω | 100 Ω | 1 µH | 1 µF | 0.1 Ω |
| 100 Ω | 10000 Ω | 100 Ω | 1 µH | 10 µF | 0.1 Ω |
| 100 Ω | 10000 Ω | 1000 Ω | 10 µH | 0.1 µF | 1 Ω |

As illustrated in Table I, the values of resistors $R_{P1}$, $R_{P2}$ and $R_{P3}$ are used in one embodiment of the invention to individually specify the inductance of filter inductor L, the capacitance of filter capacitor $C_O$ (which will generally also include the capacitance of capacitors included in the SMPS and a load capacitance factor), and an esr value for filter capacitor $C_O$. Given the information provided from Table I, the compensation applied by digital compensator 16 can be determined. Alternatively or in combination, other control parameters of an SMPS can be determined. While the decision-making process involved in compensating an SMPS is complex, for the purposes of illustration, some of the compensation decisions and computations that will generally be used to compensate the SMPS of FIG. 1 in accordance with the supplied values of resistors $R_{P1}$, $R_{P2}$ and $R_{P3}$ will be described below.

One of the most important pieces of information supplied by the values of resistors $R_{P1}$, $R_{P2}$ and $R_{P3}$ is the resonant frequency of the output filter of the SMPS, formed by inductor L and capacitor $C_O$. The resonant frequency will be lower than the switching frequency of the SMPS, in order for the output filter to remove the variation due to switching, and generally, the ratio between the switching frequency and the filter's resonant frequency will be at least 4 and may be 10 or greater. At the resonant frequency $f_C$ of the SMPS output filter, the control loop acts to prevent oscillation by virtue of the response of digital compensator 16, which provides zeros to cancel the two poles in the response due to the output filter, effectively extending a response that would otherwise peak at $f_C$ and then roll-off above $f_C$, where $f_C$ is given by:

$$f_C = 1/2\pi\sqrt{LC}$$

where L is the inductance of inductor L and C is the capacitance of capacitor $C_O$.

Figure 2A:
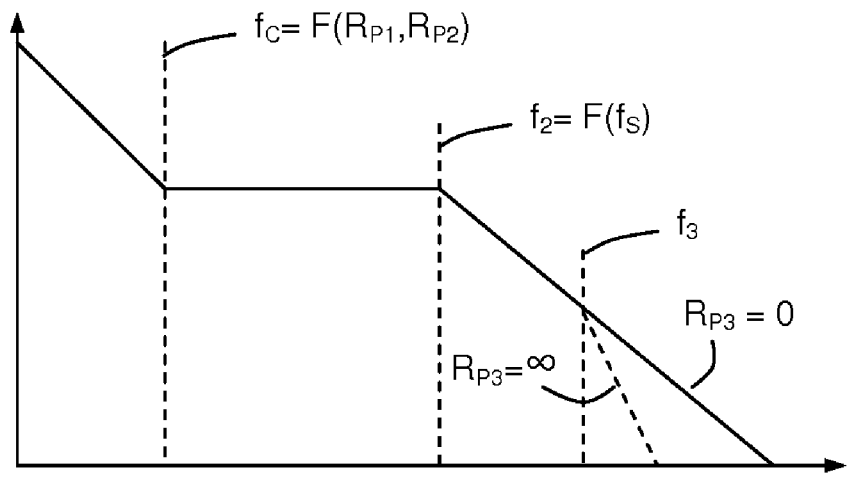
FIG. 2 are bode amplitude plots of a digital compensator response set by filter component values provided in accordance with an embodiment of the invention.

Referring now to FIG. 2A, a Bode plot of a digital compensator response of the SMPS of FIG. 1 is shown, in which the resonant frequency $f_C$ of the filter is specified by the values of resistors $R_{P1}$ and $R_{P2}$ according to the following equation:

$$1/2\pi\sqrt{R_{P1}R_{P2}(\mu F \mu H/k\Omega^2)}$$

The above equation conforms to the scaling factors (10 µF/kΩ and 0.1 µH/kΩ) present in Table I and illustrates a unique value provided for each of the inductance and capacitance of the output filter through external component value sense circuit 30 of FIG. 1. Parameter conversion block 18 uses the values of resistors $R_{P1}$ and $R_{P2}$, along with other information such as the switching frequency, output voltage and input voltage of the SMPS to determine the proper response of digital compensator 16. For example, as illustrated, the values of resistors $R_{P1}$ and $R_{P2}$ are used to determine the zero positions at $f_C$, but not the rolloff frequency at $f_2$, which is determined from the switching frequency of the SMPS and is information already available within controller IC 10.

Also illustrated in FIG. 2A is selective placement of a zero at frequency $f_3$, which is a frequency at which the esr of output capacitor $C_O$ introduces a lead phase shift in the loop response and an increase in the amplitude response. The esr zero is generally beneficial and taken into account in SMPS converter designs that use electrolytic capacitors. However, in designs that use ceramic capacitors, the esr zero generally occurs at a much higher frequency. Therefore, a zero is added to the response of digital compensator 16 in order to provide the desired response in SMPS implementations that use ceramic capacitors for output capacitor $C_O$. FIG. 2A illustrates providing such a zero when the terminal provided for resistor $R_{P3}$ is open-circuited (infinite) and not providing the zero when resistor $R_{P3}$ is provided by a jumper (zero ohms). In the depicted example the value of resistor $R_{P3}$ is essentially used as a binary state indicating a type of output capacitor $C_O$, where a jumper indicates, for example, that output capacitor $C_O$ is an electrolytic capacitor and an open circuit indicates that output capacitor $C_O$ is ceramic. As will be illustrated below, the terminal provided for connection of resistor $R_{P3}$ can instead be provided as a digital input terminal. Alternatively, a position of the zero might be computed from an esr value indicated by the resistance of resistor $R_{P3}$ and the resistance of resistor $R_{P2}$, which specifies the capacitance value of output capacitor $C_O$.

Figure 2B:
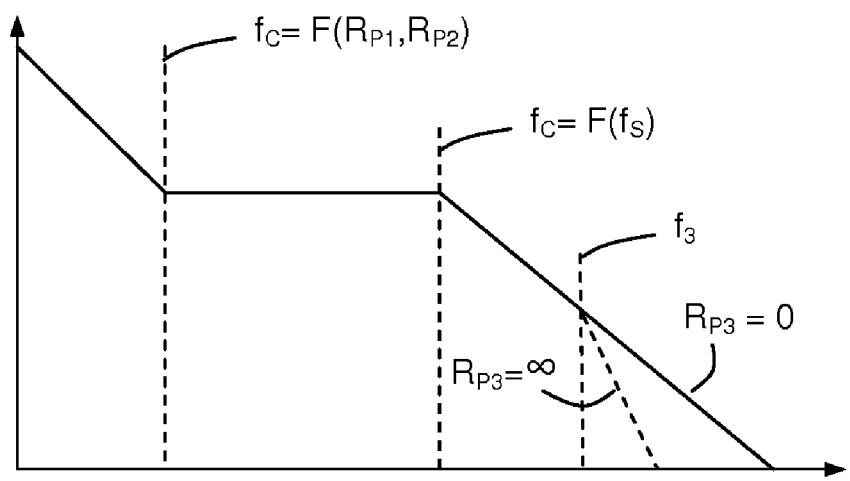

While FIG. 2A illustrates a digital compensation scheme based on individual values for the filter components as indicated by the resistances of resistors $R_{P1}$ and $R_{P2}$, e.g., $f_C$=F($R_{P1}$,$R_{P2}$), it is also possible to combine the component values in a lesser number of externally-supplied values. FIG. 2B illustrates the same compensator response as illustrated in FIG. 2A, but resistor $R_{P2}$ is not needed and frequency $f_C$=F($R_{P1}$) is solely a function of the value of resistor $R_{P1}$, which may indicate a value of the LC product, the square root of the LC product, the reciprocal of the square root, etc., thereby combining the filter inductance and capacitance in a form closer to the final computation of the resonant frequency of the filter and dependent solely on the filter inductance and capacitance values. Further, it is understood that resistors $R_{P1}$ and $R_{P2}$ may actually comprise multiple resistors. For example, a portion of resistor $R_{P2}$ may be included in a voltage regulator module (VRM) and another portion on a motherboard, so that the individual resistors are connected in series when the VRM is mated to the motherboard. Such a configuration can specify the portion of combined output capacitance represented by output capacitor $C_O$ that is present in the VRM using the portion of resistor $R_{P2}$ included in the VRM and the portion of the output capacitance on the motherboard using the portion of resistor $R_{P2}$ included on the motherboard. Other values, such as esr, might be specified by a parallel connection of resistors, and the parallel/series configurations would be reversed if capacitors are used instead of resistors.

Figure 3A:
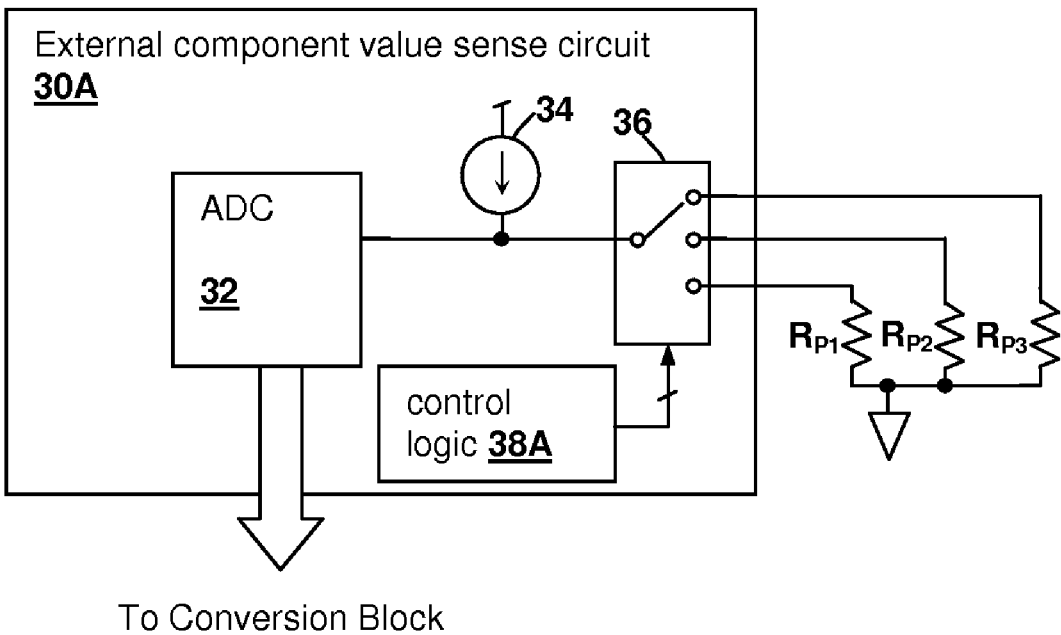
FIGS. 3A and 3B are schematic diagrams depicting external component value sense circuits that may be used to implement the SMPS of FIG. 1, in accordance with embodiments of the invention.

Referring now to FIG. 3A, an external component value sense circuit 30A that may be used within controller IC 10 of FIG. 1 is illustrated. External component value sense circuit 30A of FIG. 3A illustrates a circuit that determines resistance values of resistors $R_{P1}$, $R_{P2}$ and $R_{P3}$ as illustrated in FIG. 1, by selecting the resistors using a selector 36, providing a current from a current source 34 and measuring the resultant voltage developed on the selected resistor using an analog-to-digital converter (ADC) 32. A control logic 38A sequences through the terminals provided for connection of resistors $R_{P1}$, $R_{P2}$ and $R_{P3}$ at start-up, so that a compensation response can be set for digital compensator 16 that provides the desired SMPS response based on the filter component values and/or types specified by one or more resistors $R_{P1}$, $R_{P2}$ and $R_{P3}$, or alternatively, a combination of the filter values specified by one or more resistors $R_{P1}$, $R_{P2}$ and $R_{P3}$, such as the LC product.

Figure 3B:
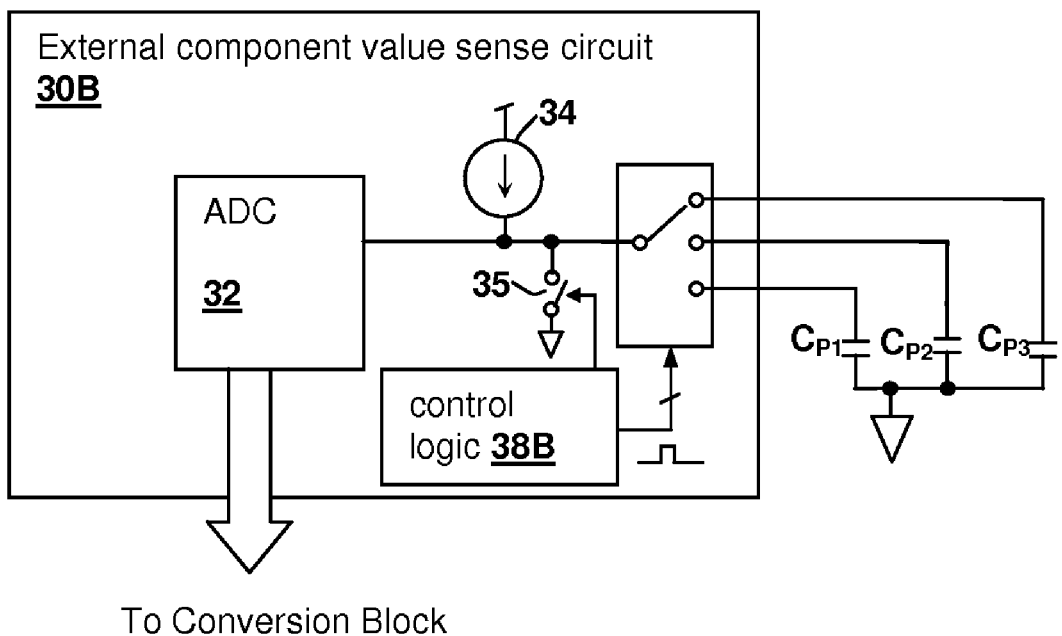

Referring now to FIG. 3B, another external component value sense circuit 30B that may be used within a controller in accordance with another embodiment of the invention is illustrated. External component value sense circuit 30B is designed for use with external capacitors $C_{P1}$, $C_{P2}$ and $C_{P3}$, which are used to indicate SMPS output filter component values just as resistors $R_{P1}$, $R_{P2}$ and $R_{P3}$ are used in external component value sense circuit 30A of FIG. 3A. In external component value sense circuit 30B, a switch 35 is provided to discharge a selected one of capacitors $C_{P1}$, $C_{P2}$ and $C_{P3}$ which are then charged for a predetermined time period by control logic 38B, e.g., during a pulse generated by control logic 38B. Near the end of the pulse, ADC 32 captures and measures the voltage on the selected one of capacitors $C_{P1}$, $C_{P2}$ and $C_{P3}$ to provide a value, which can then be used to compute the capacitance of the selected capacitor according to:

$$C = \frac{IT_P}{V}$$

where I is the magnitude of current source 34. $T_P$ is the pulse period and V is the magnitude of the voltage across the selected capacitor at the end of the pulse period. External component value sense circuits 30A-30B of FIGS. 3A-3B are exemplary, and it is understood that there are many ways to measure resistance and/or capacitance, and further, that resistors and capacitors may be combined or used interchangeably in order to indicate different values or types of the filter components.

Figure 4:
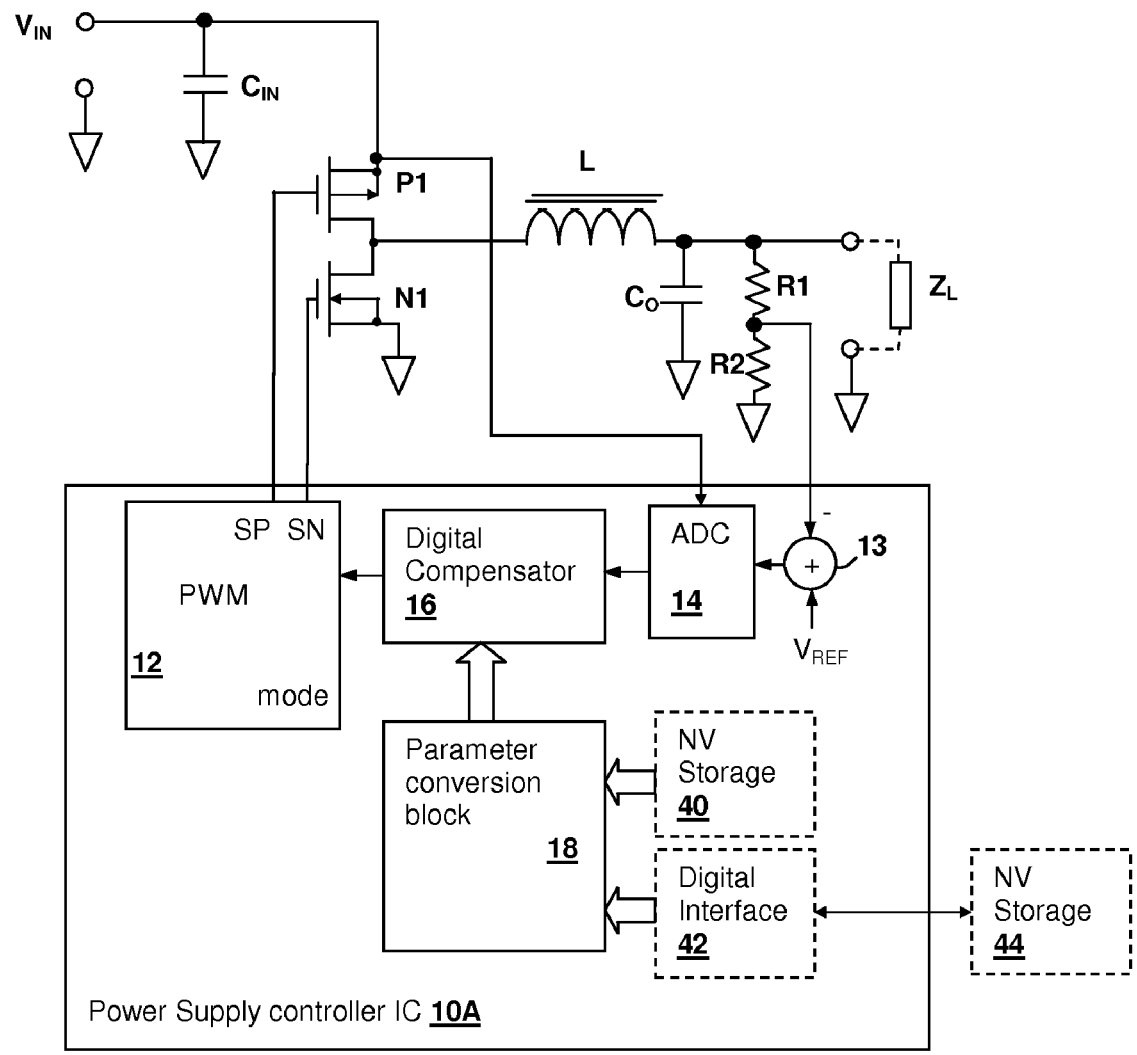
FIG. 4 is a schematic diagram depicting an SMPS in accordance with another embodiment of the invention.

Referring now to FIG. 4, a buck converter including an SMPS controller IC 10A in accordance with another embodiment of the invention is shown. In the converter of FIG. 4, controller IC 10A receives digital information that specifies either the individual component values of the filter, or combinations such as the LC product, as described above. The information may be programmed into an internal non-volatile (NV) storage 40, or received from one or more terminals via a digital interface 42, for example, from an external NV storage 44. The remainder of the operation of the buck converter of FIG. 4 is the same as that described above with reference to FIG. 1 with the difference being how the SMPS output filter information is supplied to controller IC 10A.

Figure 5A:
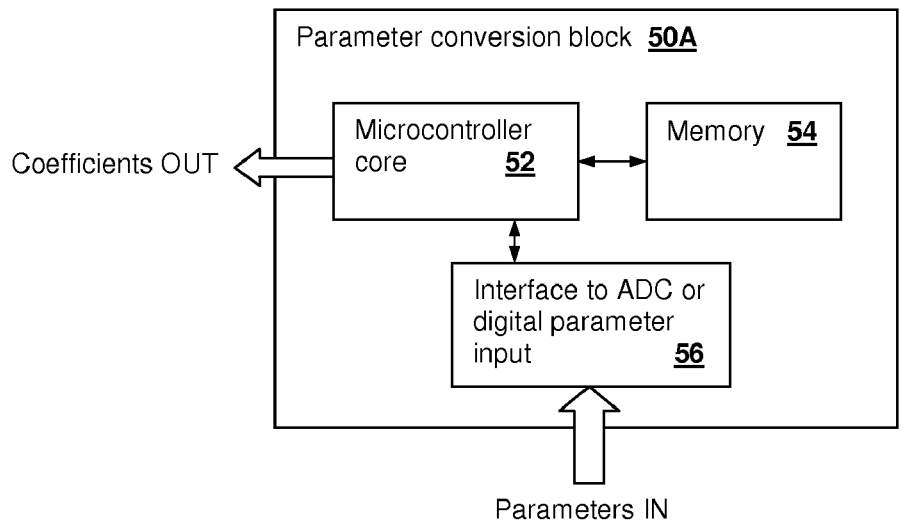
FIGS. 5A and 5B are schematic diagrams depicting parameter conversion blocks that may be used to implement the SMPSs of FIG. 1 and FIG. 4, in accordance with embodiments of the invention.

Referring now to FIG. 5A, a parameter conversion block in accordance with an embodiment of the present invention is shown. A microcontroller core 52 receives filter component value/type information from an interface 56 that receives the filter component value/type information from an ADC, such as in the exemplary SMPS of FIG. 1, or from a digital parameter input, such as in the exemplary SMPS of FIG. 4. A memory 54 provides storage of program instructions of and data for use by a computer program product that implements the algorithms that convert the output filter component value/type information to compensation coefficients that dictate the pole/zero locations in the response of digital compensator 16 of FIGS. 1 and 4.

Figure 5B:
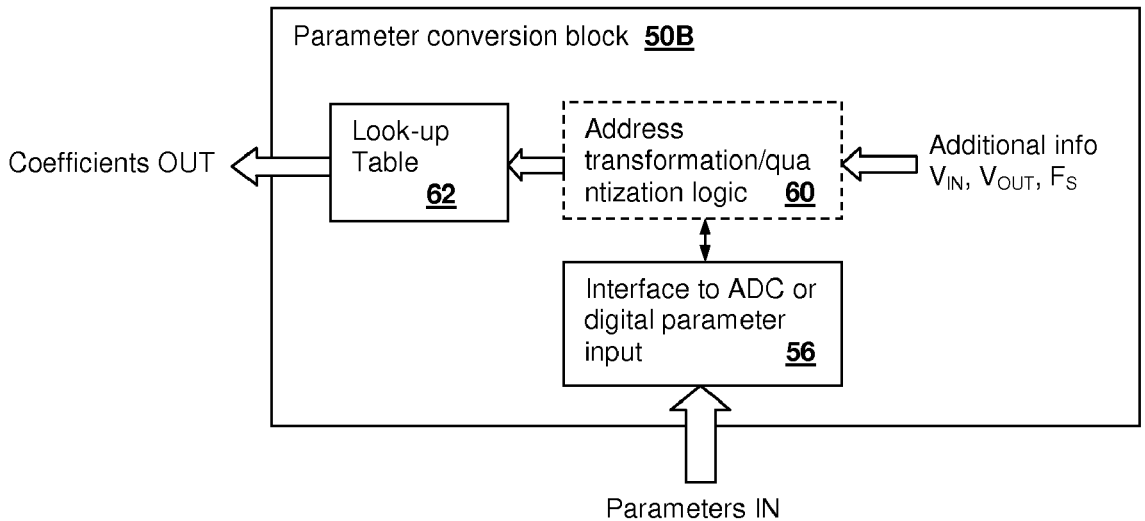

Referring now to FIG. 5B, a parameter conversion block in accordance with another embodiment of the present invention is shown. A look-up table 62 provides coefficients to a digital compensator such as digital compensator 16 of FIGS. 1 and 4. The coefficients are determined according to a look-up table address that is provided from address transformation and quantization logic 60. Address transformation and quantization logic 60 receives the filter component value/type information from interface 56 and forms the address needed to index look-up table 62, which may be a simple as combining bit-fields. For example, if 4-bit ADC output values are provided to indicate inductance and capacitance of the SMPS output filter, then an 8-bit number can be formed that selects 1 of 256 entries in look-up table 62, that each have corresponding compensation coefficients. Additional information available internal to the controller IC, such as input voltage, output voltage and switching frequency may also be provided to address transformation/quantization logic 60 in order to select the proper index for look-up table 62. Additionally, it is understood that combinational logic may be substituted for address transformation/quantization logic 60 and look-up table 62 to obtain identical results.

Figure 6:
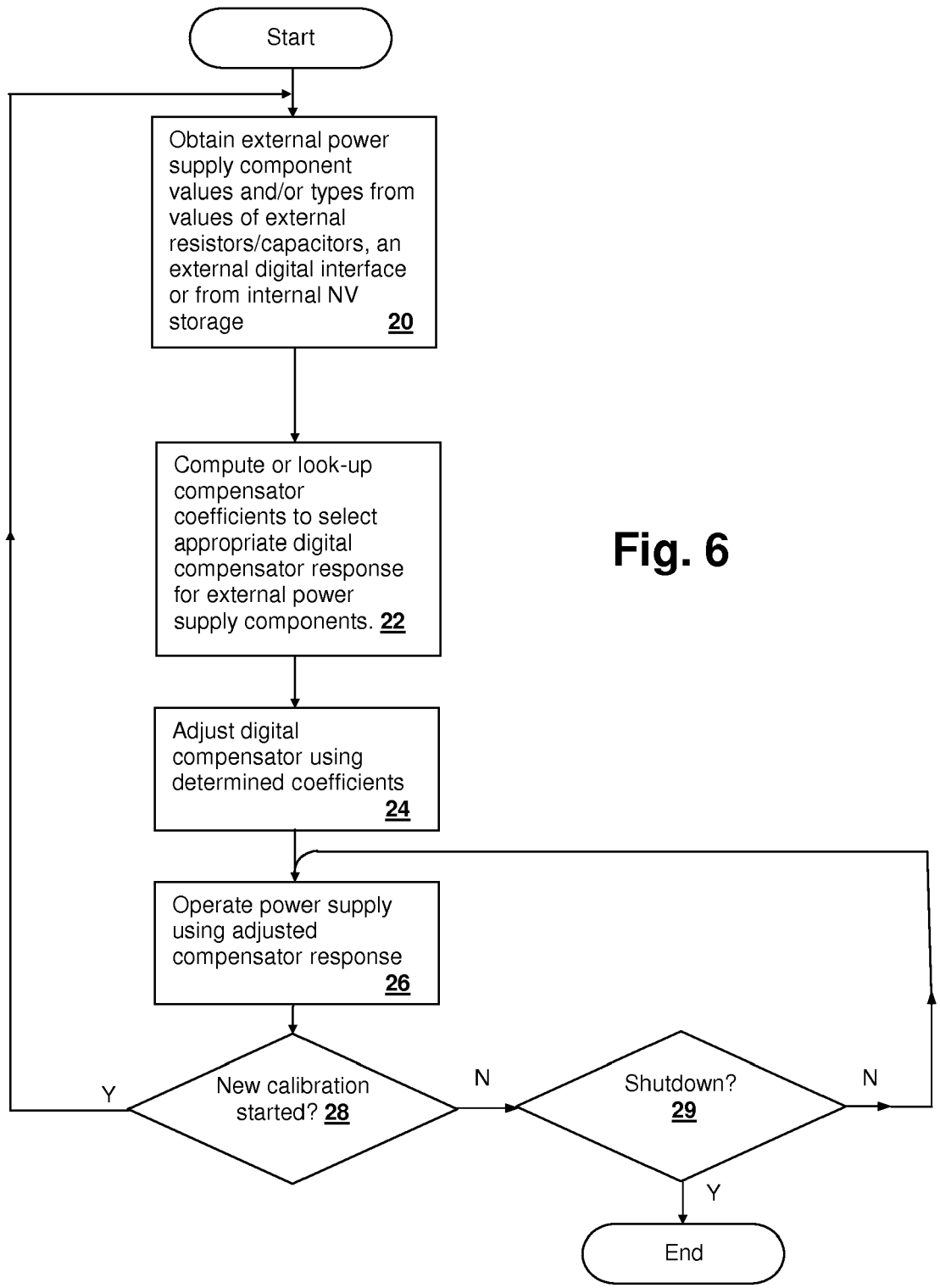
FIG. 6 is a flowchart depicting a method of compensating an SMPS in accordance with an embodiment of the invention.

Referring now to FIG. 6, a compensation method in accordance with an embodiment of the invention is illustrated. First, power supply filter component values and/or types are obtained from the values of external resistors/capacitors, from a digital interface, or from internal NV storage (step 20). The compensator coefficients are either computed or looked-up to select the appropriate digital compensator response for the external filter components (step 22). The digital compensator is adjusted using the determined coefficients (step 24) and the power supply is operated using the adjust compensator response (step 26), until a new calibration is started (decision 28) or the power supply is shut down (decision 29). While with fixed resistor/capacitors the "calibration" is actually an initialization performed generally only at start-up, with externally specified digital values, or with values programmed into internal NV storage via an interface, the filter component values may be adjusted for operating conditions external to the IC, such as temperature and input voltage. Therefore, in such embodiments, new calibration cycles (decision 28) may be initiated at times other than start-up, in accordance with an embodiment of the present invention.

While the invention has been particularly shown and described with reference to the preferred embodiments thereof, it will be understood by those skilled in the art that the foregoing and other changes in form, and details may be made therein without departing from the spirit and scope of the invention. For example, while the above description is particularly tailored to digital compensators, it is understood that analog compensators could have a programmable response that is computed or looked-up from external component parameters specified by techniques according to the present invention as described above.

What is claimed is:

1. An integrated circuit for controlling a switching power converter, the integrated circuit comprising:
   a digital control block for controlling switching of the switching power converter according to a response determined by one or more adjustable coefficients; and
   a conversion block for converting information specifying at least one of a value or a type of at least one component of an output filter of the switching power converter external to the integrated circuit to determine the one or more adjustable coefficients.

2. The integrated circuit of claim 1, wherein the digital control block is a digital compensator that determines a frequency and a phase response of a control loop of the switching power converter, and wherein the one or more adjustable coefficients adjust the frequency and the phase response of the control loop.

3. The integrated circuit of claim 1, wherein the conversion block is coupled to one or more terminals of the integrated circuit for receiving the information specifying at least one of the value or type of the at least one component as at least one binary value.

4. The integrated circuit of claim 3, wherein the one or more terminals includes a terminal for receiving a one-bit value indicating a type of a capacitive storage element of the switching power converter.

5. The integrated circuit of claim 3, further comprising an interface for receiving a sequence of the at least one binary value specifying the value of the at least one component from the one or more terminals.

6. The integrated circuit of claim 1, further comprising a sensing circuit for sensing a value of a resistance at a terminal of the controller integrated circuit, wherein the value of the resistance provides the information specifying the value or type of the at least one component.

7. The integrated circuit of claim 1, further comprising a sensing circuit for sensing a value of a capacitance at a terminal of the controller integrated circuit, wherein the value of the capacitance provides the information specifying the value or type of the at least one component.

8. The integrated circuit of claim 1, further comprising a non-volatile storage for storing the information specifying the value or type of the at least one component, and wherein the conversion block retrieves the information specifying the value or type of the at least one component from the non-volatile storage.

9. The integrated circuit of claim 1, wherein the conversion block comprises:
   a look-up table storing values for the one or more adjustable coefficients as indexed by the information specifying at least one of a value or a type of at least one component; and
   control logic for retrieving one or more particular values from the look-up table according to the information specifying at least one of a value or a type of at least one component and setting the one or more adjustable coefficients according to the retrieved one or more particular values.

10. The integrated circuit of claim 1, wherein the conversion block comprises a processor for executing program instructions that compute values of the one or adjustable coefficients from the information specifying at least one of a value or a type of at least one component.

11. A method of operating a switching power converter, the method comprising:
   receiving, at a controller integrated circuit of the switching power converter, information specifying at least one of a value or a type of at least one component of an output filter of the switching power converter that is external to the controller integrated circuit;
   within the controller integrated circuit, converting the received information to determine corresponding one or more values for one or more adjustable coefficients that control operation of a controller that controls switching in the switching power converter;
   adjusting the one or more adjustable coefficients in conformity with the one or more values determined by the converting; and
   controlling the switching power converter using the controller in accordance with the coefficients as adjusted by the adjusting.

12. The method of claim 11, wherein the controller is a compensator that controls a loop response of the switching power converter.

13. The method of claim 11, wherein the receiving receives the information specifying at least one of the value or type of the at least one component as at least one binary value at one or more terminals of the controller integrated circuit.

14. The method of claim 11, wherein the receiving receives a one-bit value indicating a type of a capacitive storage element of the switching power converter.

15. The method of claim 11, wherein the receiving receives a sequence of the binary values specifying the value of the at least one component from a storage device external to the integrated circuit.

16. The method of claim 11, wherein the receiving comprises sensing a value of a resistance at a terminal of the controller integrated circuit, wherein the value of the resistance provides the information specifying the value or type of the at least one component.

17. The method of claim 11, wherein the receiving comprises sensing a value of a capacitance at a terminal of the controller integrated circuit, wherein the value of the capacitance provides the information specifying the value or type of the at least one component.

18. The method of claim 11, further comprising retrieving the information specifying the value or type of the at least one component from a non-volatile storage within the controller integrated circuit.

19. The method of claim 11, wherein the converting comprises looking up values for the one or more adjustable coefficients from a look-up table internal to the controller integrated circuit and indexed by the information specifying at least one of a value or a type of at least one component.

20. The method of claim 11, wherein the converting comprises executing program instructions that compute values of the one or adjustable coefficients from the information specifying at least one of a value or a type of at least one component using a processor internal to the controller integrated circuit.

21. An integrated circuit for controlling a switching power converter, the integrated circuit comprising:
a digital control block for controlling switching of the switching power converter according to a response determined by one or more adjustable coefficients; and
a conversion block for converting information pre-computed from at least two values of one or more components of an output filter of the switching power converter external to the integrated circuit to determine the one or more adjustable coefficients, wherein the information is pre-computed from the at least two values and independent of any other operating parameter of the switching power converter.

22. The integrated circuit of claim 21, wherein the digital control block is a digital compensator that determines a frequency and a phase response of a control loop of the switching power converter, and wherein the one or more adjustable coefficients adjust the frequency and the phase response of the control loop.

23. The integrated circuit of claim 21, wherein the at least two values are an inductance of at least one inductor of the output filter and a capacitance of at least one capacitor of the output filter.

24. The integrated circuit of claim 21, wherein the at least two values are an equivalent series resistance of at least one capacitor of the output filter and a capacitance of the at least one capacitor of the output filter.

25. A method of operating a switching power converter, the method comprising:
receiving, at a controller integrated circuit of the switching power converter, information pre-computed from at least two values of one or more components of an output filter of the switching power converter external to the integrated circuit;
within the controller integrated circuit, converting the received information to determine corresponding one or more values for one or more adjustable coefficients that control operation of a controller that controls switching in the switching power converter;
adjusting the one or more adjustable coefficients in conformity with the one or more values determined by the converting; and
controlling the switching power converter using the controller in accordance with the coefficients as adjusted by the adjusting.

26. The method of claim 25, wherein the controller is a compensator that controls a loop response of the switching power converter.

* * * * *